Jan. 22, 1957 R. K. WILLARDSON ET AL 2,778,802

INTERMETALLIC COMPOUNDS OF GROUPS III AND V METALS CONTAINING SMALL AMOUNTS OF NICKEL, COBALT OR IRON

Filed April 26, 1954

INVENTORS.
Robert K. Willardson
Harvey L. Goering
Theodore C. Harmon

BY Gray, Mase, Wilbermuth and Dunson

ATTORNEYS.

United States Patent Office
2,778,802
Patented Jan. 22, 1957

2,778,802

INTERMETALLIC COMPOUNDS OF GROUPS III AND V METALS CONTAINING SMALL AMOUNTS OF NICKEL, COBALT OR IRON

Robert K. Willardson, Harvey L. Goering, and Theodore C. Harman, Columbus, Ohio, assignors, by mesne assignments, to The Battelle Development Corporation, Columbus, Ohio, a corporation of Delaware Application April 26, 1954, Serial No. 425,396

9 Claims. (Cl. 252—62.3)

This invention relates to semiconductor-material compounds of the third and fifth periodic groups and more in particular to the introduction of small amounts of transition metals to such compounds in order to improve their electrical characteristics.

It is well known that the intermetallic compounds, such as indium antimonide, indium arsenide, indium phosphide, aluminum antimonide, and gallium antimonide of the third and fifth groups of the periodic table, exhibit semiconductor characteristics (H. Welker, Zeitschrift für Naturforschung, vol. 8A, April 1953). Of these, the the latter three are known to be useable in rectifiers, but indium antimonide and indium arsenide are believed not to be useable in rectifiers, except perhaps at low temperatures. However, indium antimonide and indium arsenide do exhibit a magnetoresistive effect, and are useable in devices requiring this characteristic. Indium phosphide, aluminum antimonide and gallium antimonide also can be used to provide the transistor effect.

An object of this invention is to improve the electrical characteristics of intermetallic compounds of the third and fifth periodic groups by addition thereto of small amounts of transition metals.

Another object is to increase the carrier mobility in intermetallic compounds of the third and fifth periodic groups by addition thereto of small amounts of first series transition metals—nickel, cobalt, and iron.

A further object of this invention is to increase the magnetoresistance of intermetallic compounds of the third and fifth periodic groups by addition thereto of first series transition metals.

A still further object is to increase the mobility and magnetoresistance of indium antimonide, indium arsenide, indium phosphide, aluminum antimonide and gallium antimonide by additions thereto of small amounts of nickel, cobalt, and iron.

Other objects and advantages of this invention will be apparent from the following specification, the included drawings, and the appended claims.

It has now been found that additions of small amounts of nickel, cobalt, or iron to intermetallic compounds of the third and fifth periodic groups, especially indium antimonide, indium arsenide, indium phosphide, aluminum antimonide, and gallium antimonide have a marked effect on the characteristics of these materials. The two most notable of these effects are an increase in carrier mobility and a consequent increase in the magnetoresistance. The former effect is very desirable in increasing the maximum frequency at which devices, such as rectifiers and transistors, using these compounds are practical. The noted increase in magnetoresistance is very significant and is considerably higher than that of the materials presently being used for this purpose. For example, a compound of indium antimonide modified by about 0.5 weight percent of cobalt antimonide (about 0.3 atomic percent of cobalt) has approximately five times the magnetoresistance of bismuth at room temperature.

Figure 1:
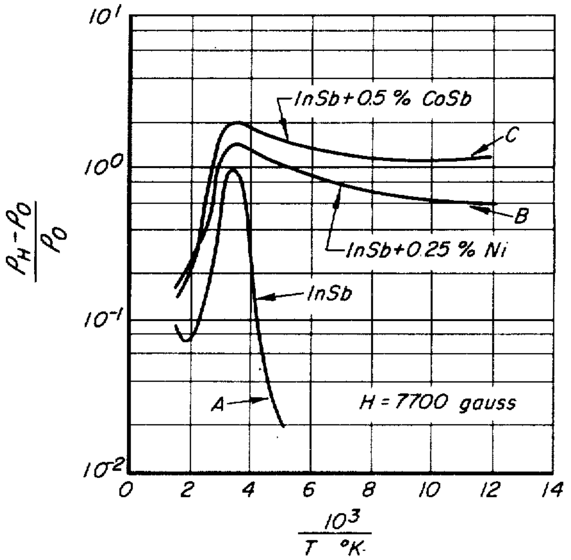
Fig. 1 is a graph illustrating the effect of temperature on magnetoresistance of P-type indium antimonide with cobalt and nickel additions as compared with P-type indium antimonide without these additions.

Typical examples of the increase in magnetoresistance of intermetallic compounds by additions thereto of first series transition metals are illustrated in Fig. 1. In these curves, the magnetoresistance is expressed as a change in resistance with magnetic field applied divided by the resistance with no magnetic field. For the measurements of magnetoresistance as a function of temperature, magnetic fields of 7700 gauss were used. Curve A illustrates the effect of temperature on magnetoresistance of indium antimonide without impurities. Curves B and C show the effect of temperature on magnetoresistance of indium antimonide with additions of 0.25 weight percent of nickel (about one atomic percent of nickel) and 0.5 weight percent of cobalt antimonide, respectively. It is apparent from these curves that the variation of magnetoresistance with temperature is less in the vicinity of room temperature, in the indium antimonide containing the transition metal additions, than in the indium antimonide not containing said addition, and that decrease in magnetoresistance with decreasing temperature is much smaller in the indium antimonide containing the addition than in the indium antimonide not containing a transition metal addition.

Figure 2:
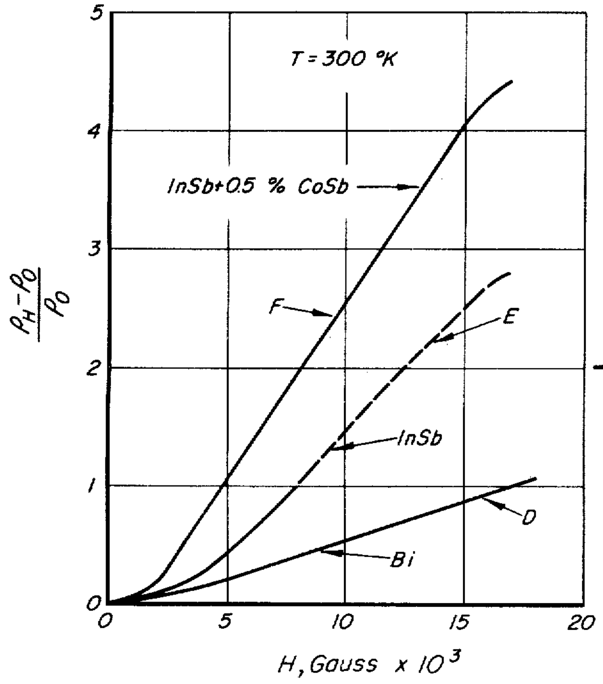
Fig. 2 is a graph comprising a curve illustrating the change of resistance as a function of magnetic field strength of P-type indium antimonide with an addition of 0.5 weight percent of cobalt antimonide, together with similar curves for P-type indium antimonide without such addition and for bismuth.

In Fig. 2, curves D, E, and F illustrate respectively the effect of changes in magnetic field upon the resistance of bismuth, indium antimonide, and indium antimonide containing 0.5 weight percent of cobalt antimonide. The temperature was held constant at 300° K.

The previously mentioned effects of increased carrier mobility and increased magnetoresistance have been noted when about 0.001 to about 5 atomic percent of nickel, cobalt, or iron is added to the intermetallic compound. The transition metal may be added to the compound either directly as an element, or in the form of a compound with the fifth periodic group element of the intermetallic compound to which it is added. Thus, either nickel or nickel antimonide may be added to the compounds indium antimonide, gallium antimonide or aluminum antimonide. Similarly, either nickel or nickel arsenide may be added to indium arsenide and either nickel or nickel phosphide may be added to indium phosphide. Although the transition metal may be added as an element, upon being combined with the intermetallic compound, it forms a compound with the fifth periodic group element of the intermetallic compound and some of the third periodic group element thereby separates out. It is important that the mixture of the intermetallic compound and the transition metal not be zone-melted, since the transition metal may be removed by zone melting.

Thus, it has been shown that, by adding from about 0.001 to about 5 atomic percent of a first series transition metal to an intermetallic compound of the third and fifth periodic groups, this invention provides an improved semiconductor material having substantially greater carrier mobility and substantially greater magnetoresistance than are obtained in the intermetallic compounds without such addition.

It will be understood, of course, that while the forms of the invention herein shown and described constitute the preferred embodiment of the invention, it is not intended herein to illustrate all of the possible equivalent forms or ramifications of the invention. It will also be understood that the words used are words of description rather than of limitation, and that various changes may be made without departing from the spirit or scope of the invention herein disclosed.

What is claimed is:

1. An intermetallic compound composed of elements of the third and fifth periodic groups and containing from 0.001 to 5 atomic percent of a first series transition metal of the group consisting of nickel, cobalt, and iron, and characterized by increased mobility and increased magnetoresistance as compared with the mobility and magnetoresistance of the same compound without said transition metal.

2. An intermetallic compound composed of a compound of the group consisting of indium antimonide, indium arsenide, indium phosphide, aluminum antimonide, and gallium antimonide, and containing from 0.001 to 5 atomic percent of a first series transition metal of the group consisting of nickel, cobalt, and iron, and being characterized by greater mobility and magnetoresistance than are exhibited by the same compound of third and fifth group elements without said metal.

3. A semiconductor material composed of a compound of an element of the fifth periodic group with a transition metal of the first series of the group consisting of nickel, cobalt, and iron, and a compound of the third periodic group metal with said fifth periodic group element, said material containing from 0.001 to 5 atomic percent of said transition metal and being characterized by mobility and magnetoresistance greater than those of said last-mentioned compound.

4. A semiconductor material composed of a compound of third and fifth periodic group elements of the group consisting of indium antimonide, indium arsenide, indium phosphide, gallium antimonide, and aluminum antimonide, and a compound of a first series transition metal of the group consisting of nickel, cobalt, and iron, with the fifth periodic group element of said first-mentioned compound, said material containing from 0.001 to 5 atomic percent of said transition metal and being characterized by mobility and magnetoresistance greater than those of said first-mentioned compound.

5. A semiconductor material composed of indium antimonide and an antimonide of a first series transition metal of the group consisting of nickel-cobalt, and iron, said material containing from 0.001 to 5 atomic percent of said transition metal and being characterized by mobility and magnetoresistance greater than those of indium antimonide.

6. A semiconductor material composed of gallium antimonide and an antimonide of a first series transition metal of the group consisting of nickel, cobalt, and iron, said material containing from 0.001 to 5 atomic percent of said transition metal and being characterized by mobility and magnetoresistance greater than those of gallium antimonide.

7. A semiconductor material composed of aluminum antimonide and an antimonide of a first series transition metal of the group consisting of nickel-cobalt, and iron, said material containing from 0.001 to 5 atomic percent of said transition metal and being characterized by mobility and magnetoresistance greater than those of aluminum antimonide.

8. A semiconductor material composed of indium arsenide and an arsenide of a first series transition metal of the group consisting of nickel-cobalt, and iron, said material containing from 0.001 to 5 atomic percent of said transition metal and being characterized by mobility and magnetoresistance greater than those of indium arsenide.

9. A semiconductor material composed of indium phosphide and a phosphide of a first series transition metal of the group consisting of nickel-cobalt, and iron, said material containing from 0.001 to 5 atomic percent of said transition metal and being characterized by mobility and magnetoresistance greater than those of indium phosphide.

References Cited in the file of this patent

UNITED STATES PATENTS 2,615,966 Lark-Horovitz et al. ----- Oct. 28, 1952

FOREIGN PATENTS 1,057,038 France ---------------- Mar. 4, 1954

OTHER REFERENCES

J. of the Electrochemical Society, vol. 101, No. 7, July 1954, pages 354–358.

Dedication

2,778,802.—*Robert K. Willardson*, *Harvey L. Goering* and *Theodore C. Harman*, Columbus, Ohio. INTERMETALLIC COMPOUNDS OF GROUPS III AND V METALS CONTAINING SMALL AMOUNTS OF NICKEL, COBALT OR IRON. Patent dated Jan. 22, 1957. Dedication filed May 7, 1973, by the assignee, *The Battelle Development Corporation*.

Hereby dedicates to the People of the United States the entire remaining term of said patent.

[*Official Gazette November 6, 1973.*]